Patented Aug. 16, 1949

2,479,498

UNITED STATES PATENT OFFICE 2,479,498

PREPARATION OF 1,2-DISUBSTITUTED-3-CYANOGUANIDINES

Hans Z. Lecher, Plainfield, Robert Prescott Parker, Somerville, and Robert Sidney Long, Plainfield, N. J., assignors to American Cyanamid Company, New York, N. Y., a corporation of Maine No Drawing. Application August 8, 1946, Serial No. 689,201

3 Claims. (Cl. 260—551)

This invention relates to guanidine derivatives and more specifically to a process for preparing 1,2-disubstituted-3-cyanoguanidines.

According to the present invention, 1,2-disubstituted-3-cyanoguanidines are prepared by reacting a correspondingly disubstituted carbodiimide with cyanamide. The general reaction is shown in Equation 1

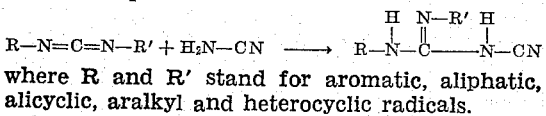

where R and R' stand for aromatic, aliphatic, alicyclic, aralkyl and heterocyclic radicals.

Some reactions of this type proceed without a catalyst, others require an alkaline catalyst or proceed in alkaline media.

The substituent radicals, R and R' may be alkyl, aryl, alkaryl, aralkyl, alicyclic, or heterocyclic, and may be saturated or unsaturated. Examples of such radicals are methyl, ethyl, propyl, isobutyl, butyl, octyl, dodecyl, octadecyl, allyl, vinyl, phenyl, tolyl, xylyl, naphthyl, biphenylyl, benzyl, cyclohexyl, pyridyl, piperidyl, furfuryl and the like. The carbodiimides may be substituted by the same or different radicals. Examples of these compounds are s-dimethylcarbodiimide, N-methyl-N'-ethylcarbodiimide, s-diethylcarbodiimide, s-dipropylcarbodiimide, s-dibutylcarbodiimide, s-didodecylcarbodiimide, s-dioctadecylcarbodiimide, s-diphenylcarbodiimide, N-p-methoxyphenyl-N'-allylcarbodiimide, N-p-nitrophenyl-N'-p-cyanophenylthiourea, s-diallylcarbodiimide, s-di-o-tolylcarbodiimide, s-di-p-xylylcarbodiimide, N-methyl-N'-phenylcarbodiimide, N-phenyl-N'-o-tolylthiourea, N-phenyl-N'-dodecylcarbodiimide, s-dibenzylcarbodiimide, s-dicyclohexylcarbodiimide, N-isopropyl-N'-p-chlorophenyl carbodiimide, N-α-naphthyl-N'-γ-methoxypropyl carbodiimide, N-phenyl-N'-α-pyridyl carbodiimide and others.

While the reaction may be carried out in the presence of any of a large number of organic solvents or diluents so long as they are essentially inert under the conditions of reaction, it is advantageous to employ alcohols wherever possible since their use generally permits greater ease in isolating the final product. However, other solvents such as ethers, ketones, aromatic hydrocarbons, and the like, may also be employed and in some specific cases are preferable. It is somewhat unexpected that alcohols can be used as solvents in this reaction because it is known that they have been reacted with some carbodiimides to form isoureas. In the reaction of the present invention, however, the carbodiimides react preferentially with the cyanamide.

The temperature for suitable reaction is varied according to the specific carbodiimide used. Thus, in the lower aliphatic substituted carbodiimide series the reaction occurs readily at room temperature, while carbodiimides containing higher aliphatic radicals require the temperature of higher boiling solvents, such as butyl alcohol or toluene.

Upon completion of the reaction, the metal sulfide formed in the reaction is removed, usually by filtration. In some cases the 1,2-disubstituted-3-cyanoguanidine may be isolated by cooling the filtrate, whereupon the 1,2-disubstituted-3-cyanoguanidine crystallizes and may be separated by filtering. In other cases, dilution of the filtrate with water serves to precipitate the 1,2-disubstituted-3-cyanoguanidine which may be recovered by filtration. In other preparations, the 3-cyanoguanidines may possess a high solubility so that the product may be recovered only by removing the solvent through evaporation.

The main advantage of the new process is to make a large number of 1,2-disubstituted-3-cyanoguanidines easily accessible. Since the disubstituted carbodiimides are easily obtained from the corresponding N,N'-disubstituted thioureas by dethionation with lead, silver or mercury oxides and the thioureas in turn are easily provided by reacting carbon disulfide or isothiocyanates with the appropriate amines, the process uses inexpensive and readily available raw materials. Its operation is simple and the yields are, in most cases, very good.

The 1,2-disubstituted-3-cyanoguanidines of this invention, where at least one of the substituents is not an aromatic radical, are new compounds.

The 1,2-disubstituted-3-cyanoguanidines of this invention are valuable organic intermediates whose principal uses are in the fields of synthetic resins, pharmaceuticals, textile assistants, and dyestuff assistants.

The following specific examples will serve to describe in greater detail the process of the present invention. It will be understood that the examples are typical of the present invention, but are not intended to limit it in any manner. In these examples, the parts given are parts by weight.

EXAMPLE 1

*1,2-diethyl-3-cyanoguanidine*

A solution of 13.2 parts of symmetrical diethylthiourea in 145 parts of diethyl ether is stirred and treated with 22 parts of anhydrous sodium sulfate and 43.2 parts of mercuric oxide.

The reaction mixture is stirred at room temperature until a small filtered portion is not discolored when treated with fresh mercuric oxide. The black mercuric sulfide is separated by filtration, the ether is removed by distillation and the diethylcarbodiimide is obtained at 35°–40° C./1.0 mm.

4.2 parts of cyanamide are added to a solution of 9.8 parts of diethyl carbodiimide in 145 parts of diethyl ether and 0.15 part of sodium methylate dissolved in 1.6 parts of methanol are added. The reaction mixture is stirred for three days at room temperature, and the ether is evaporated. The crude 1,2-diethyl-3-cyanoguanidine is recovered, and after purification by recrystallization from water, the colorless, crystalline compound melts at 129°–129.2° C.

EXAMPLE 2

1,2-diphenyl-3-cyanoguanidine

The diphenyl thiourea is treated with mercuric oxide as in the preparation of diethyl carbodiimide shown in Example 1, the diphenyl carbodiimide being obtained by distillation at 95°–100° C./1.0 mm.

8.4 parts of cyanamide are added to 19.4 parts of diphenyl carbodiimide dissolved in 88 parts of benzene. This reaction mixture is stirred and heated at the refluxing temperature for 24 hours. During this reaction time 1,2-diphenyl-3-cyanoguanidine separates as a colorless crystalline solid. At the termination of the refluxing, the reaction mixture is cooled and the aforementioned solid is recovered by filtration. After recrystallization from ethanol the crystalline 1,2-diphenyl-3-cyanoguanidine melts at 195°–195.8° C.

EXAMPLE 3

1,2-dibutyl-3-cyanoguanidine

The dibutyl thiourea is treated with mercuric oxide as in the preparation of diethyl carbodiimide shown in Example 1, the dibutyl carbodiimide being obtained by distillation at 55°–60° C./0.5 mm.

7.9 parts of cyanamide and 9.5 parts of ethanol containing 0.2 part of metallic sodium are added to a solution of 15.4 parts of dibutyl carbodiimide and 200 parts of diethyl ether. This reaction mixture is stirred and heated at reflux in order to complete the reaction, and after completion thereof the mixture is cooled, filtered, and the filtrate evaporated to dryness. After the crude 1,2-dibutyl-3-cyanoguanidine is recrystallized from dilute methanol; it melts at 63.5°–64.5° C.

EXAMPLE 4

1,2-diisopropyl-3-cyanoguanidine 16.0 parts of symmetrical diisopropyl thiourea and 30.0 parts of basic lead carbonate are suspended in benzene and heated to reflux. The reflux condenser is equipped with a water trap whereby the water which enters the condenser may be removed and in this manner the water produced during the course of the reaction may be determined. After about 18 parts of water have been produced as a result of the reaction, which may require a period as long as 10 hours, the heating is discontinued, the reaction mixture is filtered to remove the lead sulfide, and the benzene is removed under reduced pressure. Thereafter, the diisopropyl carbodiimide is distilled at atmospheric pressure over the range of 155°–160° C.

A solution of 12.6 parts of diisopropyl carbodiimide in methanol is stirred and treated with 5.0 parts of cyanamide likewise dissolved in methanol, employing a small amount of sodium methylate as catalyst. The reaction mixture is stirred at room temperature for about an hour and the 1,2-diisopropyl-3-cyanoguanidine recovered by crystallization after evaporation of the major part of the methanol. This 3-cyanoguanidine is thus provided in a yield of 80% of theoretical and on recrystallization from methanol-water (50:50) melts at 193°–195° C.

EXAMPLE 5

1-p-chlorophenyl-2-isopropyl-3-cyanoguanidine 22.8 parts of N-p-chlorophenyl-N'-isopropyl thiourea are treated with 30.0 parts of basic lead carbonate in benzene as under the first paragraph of Example 4 to provide the carbodiimide. After removal of the benzene under reduced pressure, the p-chlorophenyl isopropyl carbodiimide is distilled at 85°–87° C./0.5 mm.

19.4 parts of p-chlorophenyl isopropyl carbodiimide are dissolved in methanol and a small amount of sodium methylate added. 5.0 parts of cyanamide dissolved in methanol are added to the stirred solution of the carbodiimide. After stirring at room temperature for about 1 hour the methanol is removed under reduced pressure and the 1-p-chlorophenyl-2-isopropyl-3-cyanoguanidine is recovered in a yield of 95% of theoretical by crystallization. This 3-cyanoguanidine melts at 140°–145° C. and after recrystallization from ethanol it melts at 148°–149.5° C.

EXAMPLE 6

1,2-dicyclohexyl-3-cyanoguanidine 24.0 parts of symmetrical dicyclohexyl thiourea are treated with 30.0 parts of basic lead carbonate suspended in benzene as detailed in the first paragraph of Example 4 herein above to provide the corresponding carbodiimide. After removal of the benzene under reduced pressure, the dicyclohexyl carbodiimide is distilled at 98°–100° C./0.5 mm. The dicyclohexyl carbodiimide melts at 35°–36° C.

20.6 parts of dicyclohexyl carbodiimide are dissolved in methanol, a small amount of sodium methylate is added to serve as catalyst and 5.0 parts of cyanamide dissolved in methanol are added with stirring. Stirring is continued at room temperature for 1 hour and thereafter the methanol is removed under reduced pressure to obtain the 1,2-dicyclohexyl-3-cyanoguanidine which after recrystallization from methanol-water melts at 189°–192° C.

EXAMPLE 7

1-p-methoxyphenyl-2-allyl-3-cyanoguanidine 110 parts of N-p-methoxyphenyl-N'-allyl thiourea, 200 parts of basic lead carbonate and 500 parts of toluene are mixed with stirring to prepare a suspension. This mixture is heated under reflux for 2 hours until 8.5 parts of water have been collected in the water trap, as explained hereinabove. The mixture is filtered from the lead sulfide and the toluene is removed under reduced pressure. The residue is distilled and 25 parts of p-methoxyphenyl allyl carbodiimide are obtained at 110°–115° C./1 mm.

25.0 parts of the above-prepared carbodiimide are dissolved in ethanol and 8.4 parts of cyanamide and 0.1 part of metallic sodium are then added. The solution warms spontaneously up to a temperature of 65° C. and is allowed to stand for 24 hours. Thereafter cooling with ice results in obtaining crude 1-p-methoxyphenyl-2-allyl-3-cyanoguanidine having a melting point of 125°–127° C. Recrystallization of the crude product from benzene provides 15 parts of the pure 3-cyanoguanidine melting at 130°–131° C.

EXAMPLE 8

*1-α-naphthyl-2-γ-methoxypropyl-3-cyano-guanidine*

50 parts of N-α-naphthyl-N'-γ-methoxypropyl thiourea and 100 parts of basic lead carbonate are suspended in toluene and heated to reflux. After about 3 hours the heating is discontinued, and upon cooling, the reaction mixture is filtered to remove lead sulfide. The benzene is then removed under reduced pressure and the α-naphthyl-γ-methoxypropyl carbodiimide is obtained as the residue.

This carbodiimide, which is a yellow oil, is dissolved in 100 parts of ethanol and 15 parts of cyanamide are added together with a small piece of metallic sodium dissolved in a small amount of ethanol. The reaction mixture is permitted to stand for 24 hours and on cooling 30 parts of light colored crystals are obtained. These are separated by filtration and after drying, melt at 180°–183° C. The 1-α-naphthyl-2-γ-methoxypropyl-3-cyanoguanidine melts at 185°–186° C. after recrystallization from methanol.

What is claimed is:

1. In the manufacture of 1,2-disubstituted-3-cyanoguanidine compounds having the following formula

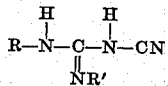

wherein R and R' are chosen from the group consisting of hydrocarbon and haloaryl radicals, the process which comprises reacting a carbodiimide having the following formula

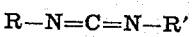

wherein R and R' are as defined above, with cyanamide in an inert organic solvent, and recovering the 1,2-disubstituted-3-cyanoguanidine so obtained.

2. The process of claim 1 in which the reaction is carried out in the presence of an alkaline catalyst.

3. The process of claim 1 in which the carbodiimide is p-chlorophenyl isopropyl carbodiimide.

HANS Z. LECHER.
ROBERT PRESCOTT PARKER.
ROBERT SIDNEY LONG.

REFERENCES CITED

The following references are of record in the file of this patent:

UNITED STATES PATENTS

| Number | Name | Date |
|---|---|---|
| 2,289,541 | Ericks et al. | July 14, 1942 |
| 2,320,225 | Ericks | May 25, 1943 |
| 2,350,453 | Ericks | June 6, 1944 |
| 2,438,124 | Lecher et al. | Mar. 23, 1948 |

FOREIGN PATENTS

| Number | Country | Date |
|---|---|---|
| 546,027 | Great Britain | June 24, 1942 |
| 577,843 | Great Britain | June 13, 1946 |

OTHER REFERENCES

Fromm, "Liebigs Annalen," vol. 361 (1908), p. 308.

Walther et al., "J. Prak. Chem.," vol. 92 (1915), p. 251.

Pellizari, "Gazz. Chim. Ital.," vol 53 (1923), pp. 384 to 392.